(12) United States Patent
Estévez Company et al.

(10) Patent No.: US 9,708,560 B2
(45) Date of Patent: Jul. 18, 2017

(54) FORMULATION, PREPARATION AND USE OF A GLYCEROL-BASED BIOFUEL

(71) Applicant: INSTITUT UNIV. DE CIÈNCIA I TECHNOLOGIA, S.A., Mollet Del Valles (ES)

(72) Inventors: Carles Estévez Company, Mollet Del Valles (ES); Natividad Bayarri Ferrer, Mollet Del Valles (ES); Josep Castells Boliart, Mollet Del Valles (ES)

(73) Assignee: Institut Univ. de Ciencia I Tecnologia, S.A., Mollet Del Valles (ES)

( * ) Notice: Subject to any disclaimer, the term of this patent is extended or adjusted under 35 U.S.C. 154(b) by 0 days.

(21) Appl. No.: 14/759,808

(22) PCT Filed: Jan. 16, 2014

(86) PCT No.: PCT/EP2014/050846
§ 371 (c)(1),
(2) Date: Jul. 8, 2015

(87) PCT Pub. No.: WO2014/111490
PCT Pub. Date: Jul. 24, 2014

(65) Prior Publication Data
US 2015/0353855 A1    Dec. 10, 2015

(30) Foreign Application Priority Data
Jan. 17, 2013 (EP) .................................... 13382016

(51) Int. Cl.
| | | |
|---|---|---|
| *C10L 1/02* | (2006.01) | |
| *C10L 8/00* | (2006.01) | |
| *C10L 10/10* | (2006.01) | |
| *C10L 1/18* | (2006.01) | |
| *C10L 1/185* | (2006.01) | |
| *C10L 1/19* | (2006.01) | |

(52) U.S. Cl.
CPC ................ *C10L 10/10* (2013.01); *C10L 1/02* (2013.01); *C10L 1/023* (2013.01); *C10L 1/026* (2013.01); *C10L 1/18* (2013.01); *C10L 1/1855* (2013.01); *C10L 1/19* (2013.01); *C10L 2200/0469* (2013.01); *C10L 2230/22* (2013.01); *C10L 2290/08* (2013.01); *C10L 2290/24* (2013.01); *C10L 2290/54* (2013.01); *C10L 2290/547* (2013.01); *Y02E 50/13* (2013.01)

(58) Field of Classification Search
CPC .. C10L 10/10; C10L 1/023; C10L 1/18; C10L 1/026; C10L 1/02; C10L 2290/54; C10L 1/1855; C10L 2230/22; C10L 2290/24; C10L 2290/547; C10L 2200/0469; C10L 1/19; C10L 2290/08; Y02E 50/13
See application file for complete search history.

(56) References Cited

U.S. PATENT DOCUMENTS

| | | | | |
|---|---|---|---|---|
| 5,484,547 | A * | 1/1996 | Mendoza ................. | C09K 5/08 252/73 |
| 8,142,525 | B2 * | 3/2012 | Company ............ | C07D 317/24 44/349 |
| 9,024,081 | B2 * | 5/2015 | Macret .................... | C07C 29/92 568/869 |
| 9,157,039 | B1 * | 10/2015 | Estevez Company ............ | C07D 317/20 |
| 2003/0163949 | A1 | 9/2003 | Delfort et al. | |
| 2003/0211974 | A1 * | 11/2003 | Brodbeck ............ | A61K 9/0019 514/21.2 |
| 2004/0025417 | A1 | 2/2004 | Delfort et al. | |
| 2010/0005708 | A1 * | 1/2010 | Estevez Company ............................ | C07D 317/24 44/388 |
| 2010/0094027 | A1 * | 4/2010 | Coleman .............. | C07D 319/06 549/416 |
| 2013/0091759 | A1 * | 4/2013 | Peterson ................. | C07C 29/60 44/307 |
| 2013/0096322 | A1 * | 4/2013 | Peterson .............. | C07D 317/12 549/229 |
| 2013/0165699 | A1 * | 6/2013 | Mastroianni ............ | C07C 29/86 568/869 |

FOREIGN PATENT DOCUMENTS

| | | | |
|---|---|---|---|
| DE | 19648960 A1 | 5/1998 | |
| EP | 1331260 | 7/2003 | |
| EP | 2049623 | 4/2009 | |
| ES | WO 2008006860 A2 * | 1/2008 | .......... C07D 317/24 |
| WO | 2008006860 | 1/2008 | |

OTHER PUBLICATIONS

Aginre, I. et al. "Acetals as Possible Diesel Additives", in "Economic Effects of Biofuel Production" (Edited by Dr. Marco Aurelio Dos Santos Bernardes), Chapter 15, 2011, 19 pages, DOI: 10.5772/24440.
Dzorio et al. Journal of the Brazilian Chemical Society, "Reactivity of Glycerol/Acetone Ketal (Solketal) and Glycerol/Formaldehyde Acetals toward Acid-Catalyzed Hydrolysis" 2012, pp. 931-937, vol. 23(5).
PCT Search Report and Written Opinion completed by the ISA/EP on Feb. 5, 2014 and issued in connection with PCT/EP2014/050846.
Agirre, I. et al., "Glycerol acetals, kinetic study of the reaction between glycerol and formaldehyde," Biomass and Bioenergy, 2011, 35, 3636-3642.

(Continued)

*Primary Examiner* — Pamela H Weiss
(74) *Attorney, Agent, or Firm* — Barnes & Thornburg LLP

(57) ABSTRACT

The present invention relates to a new biofuel formulation comprising: crude glycerol, glycerol formal, optionally at least one fatty acid glycerol formal ester and optionally at least one fatty acid methyl ester. The present invention also relates to a process for its preparation and its use for burning purposes.

16 Claims, No Drawings

(56) References Cited

OTHER PUBLICATIONS

Ruiz, V. et al., "Gold catalysts and solid catalysts for biomass transformations: Valorization of glycerol and glycerol-water mixtures through formation of cyclic acetals," Journal of Catalysis, 2010, 271, 351-357.

Jaecker-Voirol, A. et al., "Glycerin for New Biodiesel Formulation," Oil & Gas Science and Technology—Rev, 2008, 63, 395-404.

\* cited by examiner

FORMULATION, PREPARATION AND USE OF A GLYCEROL-BASED BIOFUEL

CROSS-REFERENCE TO RELATED APPLICATIONS

This application is a national stage entry under 35 USC §371(b) of PCT International Application No. PCT/EP2014/050846, filed Jan. 16, 2014, and claims the benefit of European Patent Application No. 13382016.7, filed on Jan. 17, 2013, both of which are expressly incorporated by reference herein.

FIELD OF THE INVENTION

The present invention relates to the field of biofuels. In particular, the present invention relates to a new glycerol-based biofuel, and the preparation and use thereof.

BACKGROUND OF THE INVENTION

The world has recognized the critical need to decouple economic growth from resource impact. In particular, Europe is aimed at increasing industrial competitiveness whilst drastically reducing resource and energy inefficiencies. The underlying principle is to develop enabling technologies and solutions along the value chain to "do more with less".

The following objectives have been proposed:
1. A reduction in fossil-fuel energy intensity of up to 30% from current levels by 2030 through a combination of, for example cogeneration-heat-power, process intensification, introduction of novel energy-saving processes, and progressive introduction of renewable energy sources within the process cycle.
2. By 2030, up to 20% reduction in non-renewable, primary raw material intensity versus current levels, by increasing chemical and physical transformation yields and/or using secondary and renewable raw materials with proven sustainability advantages.

The possibility to burn glycerol obtained as a by-product in the synthesis of biodiesel is an area where these principles are most relevant since biodiesel along with bioethanol is currently the major biofuel in the market and, in addition, its manufacture is inefficient because not all the oil feedstock is converted into biofuel. The concomitant by-product glycerol is obtained along with fatty acid methyl esters which are the current automotive biofuel.

Many attempts have been conducted in order to burn glycerol obtained as a by-product in the synthesis of biodiesel as a way to obtain renewable energy for burning purposes. However, crude glycerol display unfavourable fuel characteristics and it does not burn consistently in commercial burners.

Agirre I et al. "Glycerol acetals, kinetic study of the reaction between glycerol and formaldehyde", Biomass and Bioenergy, Pergamon, Amsterdam, NL, Vol. 35, no. 8, pp. 363-3642, discloses a composition resulting from the reaction between glycerol and formaldehyde. The study is aimed at determining kinetic parameters of this reaction by using ionic resins as catalysts.

Ruiz V R et al. "Gold catalysts and solid catalysts for biomass transformations: Valorization of glycerol and glycerol-water mixtures through formation of cyclic acetals", Journal of Catalysys, Academic Press, Duluth, Minn., US, Vol. 271, no. 2, pp. 351-357, discloses a composition resulting from the reaction between glycerol and formaldehyde. In this case the study is aimed at discovering new catalytic systems (Gold catalysts).

In these both documents the low conversions described must result in compositions that contain, on stoichiometric basis, large quantities (>100 ppm) of formaldehyde.

Therefore unreacted formaldehyde in the form of formaldehyde or a formaldehyde precursor, trioxane, is present in the compositions described therein. This presence of formaldehyde is absolutely not desired since it is well known in the art that, even at low concentrations, is a severe irritating substance, being even carcinogenic to humans after a long-term exposure.

Therefore, although these documents disclose a composition including glycerol and glycerol formal which may be used as a biofuel ingredient, the current industrial standards would never use this toxic composition (including formaldehyde) because the authorities would not approve this product under current regulations All these problems have prompted the inventors to develop a novel biofuel composition with improved burning characteristics when compared to crude glycerol which fulfill the need for efficient and renewable fuels and is free of toxic components, such as formaldehyde.

It is therefore an object of the present invention to provide a novel non-toxic glycerol-based biofuel formulation which circumvents the inability of crude glycerol to burn consistently in current burners. It is also an object of the invention to provide a procedure to prepare said biofuel. It is a further object of the present invention to show the better burning characteristics of the biofuel described in the present invention as compared to crude glycerol.

DETAILED DESCRIPTION OF THE INVENTION

The present invention relates to a new biofuel formulation comprising:
A) crude glycerol which can be obtained in the commercial biodiesel production process preferably comprising 60-99% w/w of glycerol, 0-2% w/w ash, 0-40% w/w water and 0-2% w/w organic residue,
B) glycerol formal which can be obtained from glycerol via acetalization reaction using a suitable acetalization agent,
C) optionally, at least one fatty acid glycerol formal ester, and
D) optionally, at least one fatty acid methyl ester, characterized in that said formulation does not include formaldehyde.

In another embodiment, the present invention relates to a new biofuel formulation consisting of:
A) crude glycerol which can be obtained in the commercial biodiesel production process preferably comprising 60-99% w/w of glycerol, 0-2% w/w ash, 0-40% w/w water and 0-2% w/w organic residue,
B) glycerol formal which can be obtained from glycerol via acetalization reaction using a suitable acetalization agent, In a further embodiment, the biofuel formulation of the present invention comprises or consists of crude glycerol, glycerol formal and at least one fatty acid glycerol formal ester.

In a further embodiment, the biofuel formulation of the present invention comprises or consists of crude glycerol, glycerol formal and at least one fatty acid methyl ester.

In a still further embodiment, the biofuel formulation of the present invention comprises or consists of crude glycerol, glycerol formal, at least one fatty acid glycerol formal ester and at least one fatty acid methyl ester.

Preferably, said biofuel formulation comprises the four components A, B, C and D in the following mass ratios: component A between 10% and 90% w/w, component B between 10% and 90% w/w, component C between 0% and 80% w/w and component D between 0 and 80% w/w in respect of the whole composition. Preferably, the mass ratios for component A is between 50% and 90% w/w, for component B between 10% to 50% w/w, component C between 0% and 40% w/w and component D also between 0% and 40% w/w in respect of the whole composition. In a particular embodiment, the biofuel of the invention comprises 70-90% w/w crude glycerol (component A), 10-30% w/w glycerol formal (component B), 0-20% w/w fatty acid glycerol formal ester (component C) and 0-20% w/w fatty acid methyl ester (component D) in respect of the whole composition.

The biofuel of the invention may contain optionally one or more additives selected from the group consisting of antioxidants, biocides, chelating agents, detergents, dispersants, solvents, corrosion inhibitors and oxide inhibitors.

In another embodiment, the biofuel formulation of the present invention comprises or consists of crude glycerol, glycerol formal, at least one fatty acid glycerol formal ester and one or more of the additives disclosed above.

In a further embodiment, the biofuel formulation of the present invention comprises or consists of crude glycerol, glycerol formal, at least one fatty acid methyl ester and one or more of the additives disclosed above.

In a still further embodiment, the biofuel formulation of the present invention comprises or consists of crude glycerol, glycerol formal, at least one fatty acid glycerol formal ester, at least one fatty acid methyl ester and one or more of the additives disclosed above.

The biodiesel-derived crude glycerol is a well known product by a skilled in the art. It refers to a mixture of glycerol, water, ashes and organic residue. The different proportions of its constituents give different grades of the glycerol ranging from crude glycerol, typically containing 80% w/w glycerol, to technical grade glycerol, typically containing higher than 98% w/w glycerol. It may contain a variable water content which depend on the original glycerol grade and the degree of drying during the optional pre-treatment step of the formulation preparation (see below).

Glycerol formal is a glycerol derivative which can be obtained by acetalization. In a preferred embodiment, glycerol formal is obtained from crude glycerol according to the procedure described in EP2049623, which disclosure is incorporated herein by reference. Glycerol formal is the glycerol acetal with the lowest molecular weight. As such it displays higher vapor pressure, lower boiling points and lower viscosities when compared to higher homologues such as glycerol acetal or glycerol propanal. As indicated below, these properties improve the burning characteristics of crude glycerol/glycerol formal/fatty acid glycerol formal ester/fatty acid methyl ester mixtures with respect to crude glycerol alone.

Water content is critical since it influences not only the heat content of the bio fuel composition but also the unit cost of the composition. In a preferred embodiment, the water content of the crude glycerol is between 0% and 30%.

The invention also relates to a process for preparing the biofuel according to the present invention. This process comprises the step of mixing crude glycerol, glycerol formal, fatty acid glycerol formal ester (if present), fatty acid methyl ester (if present) and one or more optional additives. Preferably the temperature of this process is between 20° C. and 60° C., more preferably at around 40° C. The mixing is conducted in a vessel equipped with a stirrer that provides enough power to homogenize completely the mixture. The obtained mixture is stable. Optionally a pre-treatment step is carried out. This pre-treatment step comprise filtration and optionally desalting and water evaporation.

The invention further relates to the use of the biofuel according to the present invention for burning purposes, preferably industrial burning.

Example 1: Formulation of Biofuels

Crude glycerol containing 2% organic residue and 7% ash content was heated at 60° C., filtered and added to a mixing vessel. Subsequently, glycerol formal with water content lower than 5% was added. Finally, fatty acid glycerol formal ester and fatty acid methyl ester were added and the mixture was stirred at 380 rpm for 30 minutes with a mechanical stirrer.

Example 2: Evaluation of the Burning Properties

In order to evaluate the burning properties of the biofuel of the invention, the inventors have conducted several experiments in laboratory air burners operated at ambient pressure. The biofuels under evaluation were pre-heated at 100° C.

50 g of the biofuels under evaluation were added to a stainless steel burner. The biofuels was pre-heated at 100° C. avoiding any loss of their constituents. The burner was ignited with a flame lighter. The experiments measured the capacity to light the burner and a continuous and regular burning of the fuel until completion. The results are indicated in Table1:

TABLE 1

Burning characteristics of 12 compositions containing crude glycerol, glycerol formal, fatty acid methyl esters and fatty acid glycerol formal esters. Columns 2 and 3 (from left) indicate the glycerol and water content of crude glycerol. The compositions were pre-heated to 100° C. and ignited with a flame lighter.

| Composition | Glycerol Conc. in Crude Glycerol (w/w), % | Water Conc. in Crude Glycerol (w/w), % | Crude Glycerol (w/w), % | Glycerol formal (w/w), % | Fatty Acid Methyl Ester (w/w), % | Fatty Acid Glycerol Formal Ester (w/w), % | Flame | Fuel Burns to Completion |
|---|---|---|---|---|---|---|---|---|
| 1 | 72 | 19 | 5 | 90 | 0 | 5 | YES | YES |
| 2 | 72 | 19 | 20 | 75 | 0 | 5 | YES | YES |
| 3 | 72 | 19 | 70 | 30 | 0 | 0 | YES | YES |
| 4 | 72 | 19 | 80 | 20 | 0 | 0 | YES | YES |
| 5 | 72 | 19 | 78 | 16 | 3 | 3 | NO | — |

TABLE 1-continued

Burning characteristics of 12 compositions containing crude glycerol, glycerol formal, fatty acid methyl esters and fatty acid glycerol formal esters. Columns 2 and 3 (from left) indicate the glycerol and water content of crude glycerol. The compositions were pre-heated to 100° C. and ignited with a flame lighter.

| Composition | Glycerol Conc. in Crude Glycerol (w/w), % | Water Conc. in Crude Glycerol (w/w), % | Crude Glycerol (w/w), % | Glycerol formal (w/w), % | Fatty Acid Methyl Ester (w/w), % | Fatty Acid Glycerol Formal Ester (w/w), % | Flame | Fuel Burns to Completion |
|---|---|---|---|---|---|---|---|---|
| 6  | 72 | 19 | 100 | 0  | 0 | 0 | NO  | —   |
| 7  | 95 | 3  | 78  | 16 | 3 | 3 | YES | NO  |
| 8  | 95 | 3  | 80  | 10 | 5 | 5 | YES | NO  |
| 9  | 99 | 1  | 70  | 20 | 8 | 2 | YES | NO  |
| 10 | 99 | 1  | 80  | 10 | 8 | 2 | YES | NO  |
| 11 | 99 | 1  | 78  | 16 | 3 | 3 | YES | YES |
| 12 | 99 | 1  | 86  | 14 | 0 | 0 | YES | NO  |

From the experiments indicated in Table 1, several conclusions may be drawn:

The glycerol formal concentration threshold for consistent burning in compositions containing 72% w/w glycerol is 20% w/w (Compositions 1 to 6). This threshold can be reduced to 16% w/w in compositions with higher glycerol content (Composition 11).

The influence of water seems to be critical. For example, experiments 7 and 11 show that a 2% increase in the water content of crude glycerol may actually inhibit the burning process. Experiment 5 further confirms that water is detrimental to the quality of burning.

Composition 6 is a control experiment where pure crude glycerol with 72% glycerol content is used.

The influence of fatty acid glycerol formal ester is to improve the burning quality as indicated by the results obtained with compositions 9 and 11.

In conclusion, the burning properties of crude glycerol can be greatly improved with the addition of glycerol formal. Increased concentrations of water reduce the burning quality. The higher is the water concentration in the composition, the higher glycerol formal concentration is needed to guarantee a proper burning. The presence of fatty acid glycerol formal esters in the composition favours the burning process provided that there is a sufficient glycerol formal concentration.

The invention claimed is:

1. Biofuel formulation comprising component A and component B, wherein:
   component A comprises crude glycerol, wherein the crude glycerol is present at an amount between about 5% and about 80% (w/w with respect of the biofuel formulation);
   component A comprises a maximum water amount of 19% (w/w with respect to component A);
   component B comprises glycerol formal and is present at an amount between about 20% and about 90% (w/w with respect of the biofuel formulation);
   the total percentage of component A and component B is at least 90% (w/w with respect of the biofuel formulation); and
   wherein said formulation does not include formaldehyde, and
   wherein the crude glycerol comprises ash and organic residue.

2. Biofuel formulation of claim 1, wherein
   component A comprises crude glycerol, wherein the crude glycerol is present at an amount between about 5% and about 20% (w/w with respect of the biofuel formulation); and
   component B comprises glycerol formal and is present at an amount between about 75% and about 90% (w/w with respect of the biofuel formulation).

3. Biofuel formulation of claim 1, wherein
   component A comprises crude glycerol, wherein the crude glycerol is present at an amount between about 70% and about 80% (w/w with respect of the biofuel formulation); and
   component B comprises glycerol formal and is present at an amount between about 20% and about 30% (w/w with respect of the biofuel formulation).

4. A method for improving burning of a crude-glycerol based biofuel comprising,
   mixing crude glycerol comprising ash and organic residue, glycerol formal, optionally at least one fatty acid glycerol formal ester, optionally at least one fatty acid methyl ester and optionally one or more additives selected from the group consisting of antioxidants, biocides, chelating agents, detergents, dispersants, solvents, corrosion inhibitors and oxide inhibitors; further comprising burning the crude-glycerol based biofuel.

5. The method, according to claim 4, wherein the temperature of the mixing step is between 20° C. and 60° C.

6. Biofuel formulation of claim 1 further comprising at least one fatty acid glycerol formal ester.

7. Biofuel formulation of claim 6, wherein said at least one fatty acid glycerol formal ester is present at concentration of up to 10% (w/w with respect of the biofuel formulation).

8. Biofuel formulation of claim 1 further comprising at least one fatty acid methyl ester.

9. Biofuel formulation of claim 8, wherein said at least one fatty acid methyl ester is in a concentration of up to 10% (w/w with respect of the biofuel formulation).

10. Biofuel formulation of claim 1 further comprising one or more additives selected from the group consisting of antioxidants, biocides, chelating agents, detergents, dispersants, solvents, corrosion inhibitors and oxide inhibitors.

11. Biofuel formulation of claim 2 further comprising one or more additives selected from the group consisting of antioxidants, biocides, chelating agents, detergents, dispersants, solvents, corrosion inhibitors and oxide inhibitors.

12. Biofuel formulation of claim 3 further comprising one or more additives selected from the group consisting of antioxidants, biocides, chelating agents, detergents, dispersants, solvents, corrosion inhibitors and oxide inhibitors.

13. Biofuel formulation comprising component A, component B, a fatty acid glycerol formal ester, and a fatty acid methyl ester, wherein:

component A comprises crude glycerol, component B comprises glycerol formal, and when the amount of component B is less than 20% (w/w with respect of the biofuel formulation), the amount of component A is a maximum of 78% (w/w with respect of the biofuel formulation), and component A comprises a maximum water amount of 1% (w/w with respect to component A), and wherein the crude glycerol comprises ash and organic residue.

14. Biofuel formulation of claim 13, wherein:

component A comprises crude glycerol, wherein the crude glycerol is present at an amount of about 78% (w/w with respect of the biofuel formulation);

component A comprises a water amount of 1% (w/w with respect to component A);

component B comprises glycerol formal and is present at an amount of about 16% (w/w with respect of the biofuel formulation);

the fatty acid glycerol formal ester is present at an amount of about 3% (w/w with respect of the biofuel formulation); and the fatty acid methyl ester is present at an amount of about 3% (w/w with respect of the biofuel formulation).

15. Biofuel formulation of claim 13 further comprising one or more additives selected from the group consisting of antioxidants, biocides, chelating agents, detergents, dispersants, solvents, corrosion inhibitors and oxide inhibitors.

16. The method, according to claim 4, further comprising a pre-treatment step of filtering the crude glycerol and optionally desalting and water evaporation of the crude glycerol.

* * * * *

UNITED STATES PATENT AND TRADEMARK OFFICE
CERTIFICATE OF CORRECTION

Page 1 of 1

PATENT NO. : 9,708,560 B2
APPLICATION NO. : 14/759808
DATED : July 18, 2017
INVENTOR(S) : Estéves Company et al.

It is certified that error appears in the above-identified patent and that said Letters Patent is hereby corrected as shown below:

On the Title Page

Item number (71), please correct the spelling of Applicant's name from "TECHNOLOGIA, S.A." to -- TECNOLOGIA, S.A. --.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*